US008965439B2

(12) United States Patent
Yucek

(10) Patent No.: US 8,965,439 B2
(45) Date of Patent: Feb. 24, 2015

(54) TV WHITE SPACE DATABASE ASSISTED LOCATIONING FOR TV BAND DEVICES

(71) Applicant: QUALCOMM Incorporated, San Diego, CA (US)

(72) Inventor: Tevfik Yucek, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 13/657,812

(22) Filed: Oct. 22, 2012

(65) Prior Publication Data

US 2014/0113670 A1    Apr. 24, 2014

(51) Int. Cl.
*H04B 7/00*     (2006.01)
*H04W 48/16*    (2009.01)

(52) U.S. Cl.
CPC .................................... *H04W 48/16* (2013.01)
USPC ...... 455/515; 455/3.01; 455/3.02; 455/115.3; 455/517; 455/454

(58) Field of Classification Search
CPC .................................................... H04W 48/16
USPC ............. 455/515, 3.01, 3.02, 115.3, 517, 454
See application file for complete search history.

(56) References Cited

U.S. PATENT DOCUMENTS

| | | | |
|---|---|---|---|
| 8,170,577 B2 | 5/2012 | Singh | |
| 8,749,638 B2 * | 6/2014 | Charbit et al. | 348/180 |
| 2011/0124291 A1 | 5/2011 | Gurney et al. | |
| 2011/0250908 A1 | 10/2011 | Olsson et al. | |
| 2011/0287802 A1 * | 11/2011 | Ma et al. | 455/517 |
| 2011/0317019 A1 | 12/2011 | Bahl et al. | |
| 2013/0150071 A1 * | 6/2013 | Hassan et al. | 455/454 |
| 2014/0003282 A1 * | 1/2014 | Kafle et al. | 370/254 |

OTHER PUBLICATIONS

Gurney et al., "Geo-location Database Techniques for Incumbent Protection in the TV White Space," Proceedings from DySPAN 2008: 3rd IEEE Symposium on New Frontiers in Dynamic Spectrum Access Networks, Oct. 2008, 9 pages.

* cited by examiner

*Primary Examiner* — Sanh Phu
(74) *Attorney, Agent, or Firm* — Holland & Hart LLP

(57) ABSTRACT

A method and system for obtaining an available white space channel for wireless communication using a white space device (WSD) are described. The WSD scans signals of TV transmitters, determines the received signal strength (RSSI) for those signals, and records TV data, including TV designations and corresponding RSSIs, for signals that exceed a predetermined threshold. The WSD sends TV data for at least three TV transmitters to an enhanced TV white space database (EnTVDB). The EnTVDB uses the TV data and information in its database to determine the geo-coordinates of the WSD. The EnTVDB uses the geo-coordinates of the WSD to identify available white space. The EnTVDB sends at least one channel of available white space to the white space device for its wireless communication.

34 Claims, 4 Drawing Sheets

TV WHITE SPACE DATABASE ASSISTED LOCATIONING FOR TV BAND DEVICES

BACKGROUND

The invention relates to accurately determining the location of a White Space Device (WSD) to obtain available white space from a TV White Space Database (TVDB).

RELATED ART

FCC Opinion and Order No. FCC 10-174 defines a broad set of requirements for operation of unlicensed devices in TV broadcast bands below 900 MHz and in the 3 GHz band. FCC 10-174 specifies operation of a system for allocating unused TV bandwidth, known as white space, for efficient use of available spectrum. FCC 10-174 further specifies that future system improvements are contemplated, and that experimentation with possible improvements is encouraged.

Under current FCC rules, an unlicensed device is allowed to access a TV database (TVDB) to request white space for wireless communication. This device is called a White Space Device (WSD) herein. With this request, the WSD provides its location expressed in geo-coordinates of longitude and latitude. The TVDB uses these geo-coordinates to find available white space suitable to the location, and returns a list of the available white space to the requesting WSD for wireless communication.

Known methods for obtaining geo-coordinates include use of either satellite or cellular GPS. The GPS methods are accurate and easy to use, but not every WSD is equipped with satellite or cellular capability. Moreover, even when such services are available, GPS location determination inside buildings is often unreliable.

Therefore, a need arises for a simple, accurate, and reliable method of determining a WSD location to obtain available white space.

SUMMARY OF THE EMBODIMENTS

A system and method are described in which a WSD can determine easily available TV data and send that TV data to an enhanced TVDB (EnTVDB). The EnTVDB can use the TV data and information already stored in the EnTVDB to determine accurate geo-coordinates of the WSD. Using these accurate geo-coordinates, the EnTVDB can determine the appropriate available white space and send that available white space to the WSD.

The TV data can include the received signal strength (e.g. a received signal strength indicator (RSSI)) from at least three TV transmitters. The TV data can further include channel numbers or station names of the TV transmitters. In one embodiment, the WSD only sends TV data of TV transmitters that have RSSIs above a predetermined threshold.

The information already stored in a standard TVDB includes accurate geo-coordinates and the transmitting powers of the TV transmitters within its service area. In one embodiment of the EnTVDB, the geo-coordinates and the transmitting powers stored in the EnTVDB can be indexed by TV channel numbers or TV station names to facilitate the search for the appropriate available white space. The EnTVDB with its geo-mapping functionality can advantageously use the stored information and the TV data from the WSD to determine with sufficient accuracy the geo-coordinates of the WSD (FCC requires accuracy of at least 50 meters), thereby allowing the EnTVDB to send the WSD the appropriate available white space.

In one embodiment, the EnTVDB also sends the geo-coordinates back to the requesting WSD where they are saved by the WSD. These geo-coordinates can be later used to request available white space from the EnTVDB or standard unenhanced TVDBs, which operate according to current FCC rules.

DETAILED DESCRIPTION OF THE DRAWINGS

Figure 1:
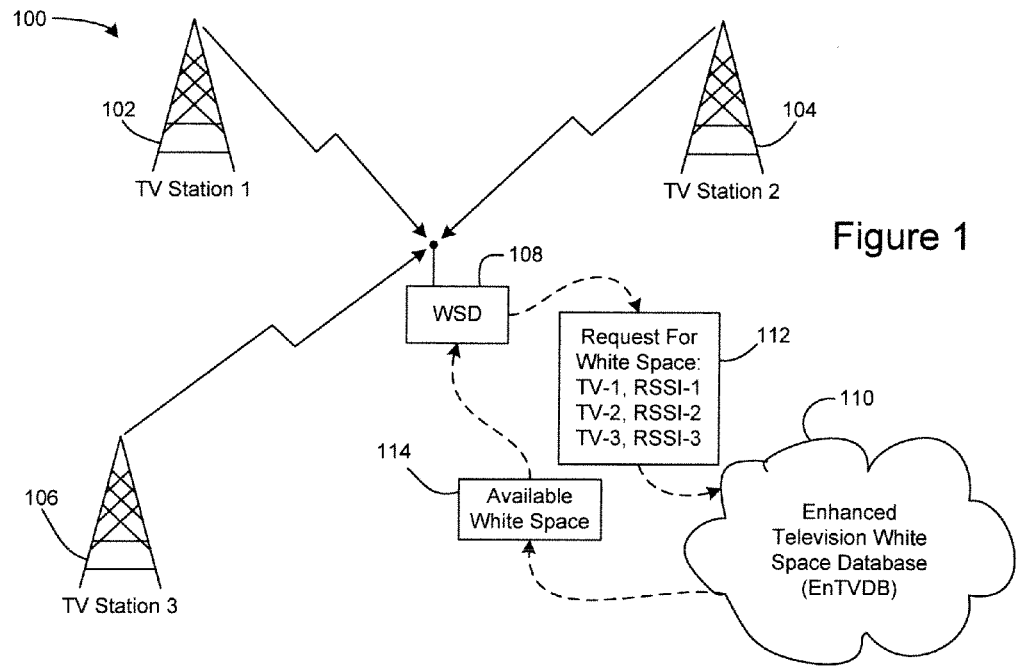
FIG. 1 illustrates a system in which an unlicensed WSD measures and records the signal strength of a plurality of TV transmitters, and an EnTVDB that can use that recorded data as well as its own stored information to determine accurate geo-coordinates of the WSD, thereby allowing the TVDB to send the WSD appropriate available white space for wireless communication.

FIG. 1 illustrates a system 100 in which an unlicensed WSD 108 measures and records the received signal strength (e.g. RSSI) of a plurality of TV stations 102, 104, 106. WSD 108 sends a request 112 for available white space to an EnTVDB 110. EnTVDB 110, using the TV data from WSD 108 and its own stored information (described in further detail below) generates a list 114 of available white space appropriate for WSD 108 and sends list 114 to WSD 108. In one embodiment, both request 112 and list 114 can be transmitted via a communication link, such as an Internet link.

According to current FCC regulations, a standard TVDB is capable of responding to a request for available white space sent from a WSD when the request includes the geo-coordinates of the WSD. In system 100, WSD 108 does not provide geo-coordinates with its request for available white space. Instead, WSD 108 provides TV data for at-least-three TV transmitters in request 112. This TV data includes the received signal strengths (e.g. the received signal strength indicators (RSSIs)) of the TV transmitters. In one embodiment, the TV data includes the channel numbers of the TV transmitters. In another embodiment, the TV data includes the station names of the TV transmitters.

EnTVDB 110 is configured to respond to request 112. Specifically, the EnTVDB can use the TV data in request 112 and its own stored information regarding TV transmitters (described below) to determine the geo-coordinates of WSD 108. Using these geo-coordinates, EnTVDB 110 can search for available white space appropriate for WSD 108, generate a list 114 of available white space, and send list 114 to WSD 108 for use in wireless communication.

Figure 2:
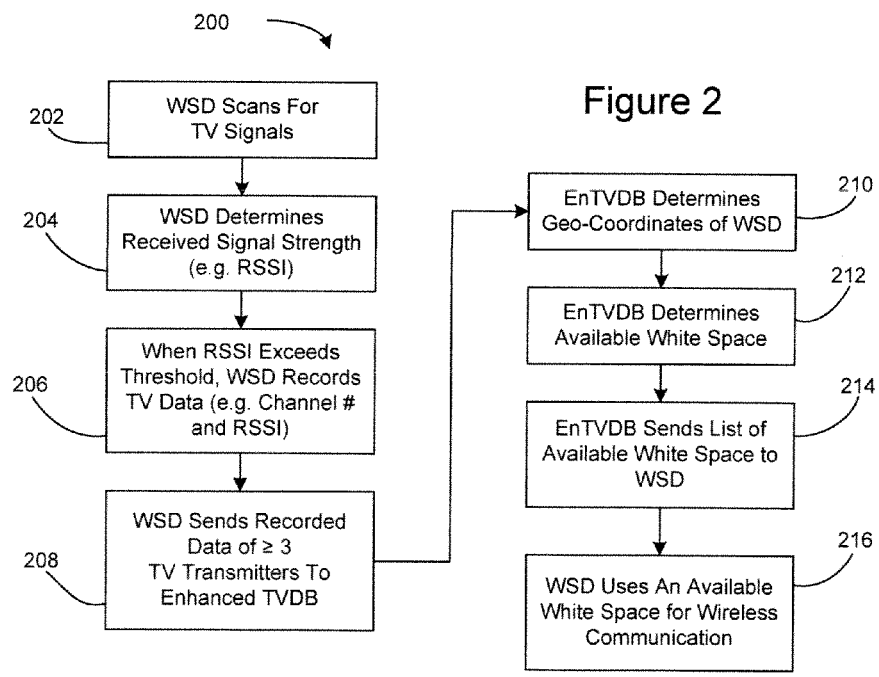
FIG. 2 is a flow diagram illustrating a method performed by the system illustrated in FIG. 1.

FIG. 2 is a flow diagram illustrating an exemplary method 200 that can be performed, for example, by WSD 108 and EnTVDB 110 of system 100. In step 202, a WSD can scan for TV signals. In step 204, the WSD can measure the RSSIs of the TV signals. When the received signal strength of a TV signal exceeds a predetermined threshold value, the WSD can record the RSSI and a corresponding TV transmitter designation as TV data in step 206. In one embodiment, the TV transmitter designation can be the channel number of the TV transmitter (e.g. channel 009, channel 002, channel 007, etc.). In another embodiment, the TV transmitter designation can be the station name of the TV transmitter (e.g. KQED, KTVU, KABC, etc.). In general, using only the RSSIs that exceed a predetermined threshold adds a margin of safety when the EnTVDB determines the geo-coordinates of the WSD.

When at least three TV data are recorded, the WSD can send its request for white space including the at least three recorded TV data to the EnTVDB in step 208. In step 210, the EnTVDB can determine the geo-coordinates of the requesting WSD. In step 212, the EnTVDB can use those geo-coordinates to search for TV white space available for use at those geo-coordinates.

Under current FCC regulations, the EnTVDB compares the white space obtained from the search with other unlicensed uses, such as competing unlicensed WSDs, wireless microphones, and rules defining non-interference with co-channel and adjacent channel use, and the like. Once the available white space has been vetted against FCC specified protection rules, a list of appropriate, available white space can be sent in step 214 to the requesting WSD. The requesting WSD can then use the available white space for wireless communication in step 216.

Figure 3:
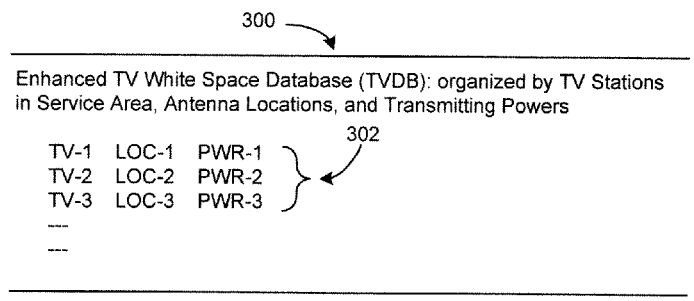
FIG. 3 illustrates an exemplary format for entries of an EnTVDB, each entry including a TV transmitter designation, an antenna location (geo-coordinates), and TV transmitting power.

FIG. 3 illustrates an exemplary format 300 for entries 302 of a database in an EnTVDB, each entry including a TV transmitter designation, antennas location (geo-coordinates), and TV transmitting power. Format 300 is generically described to facilitate the discussion herein of the actions taken by an EnTVDB for determining the geo-coordinates of a requesting WSD. Notably, the information needed by the EnTVDB for determining the geo-coordinates of the WSD is already stored by a standard TVDB according to FCC regulations.

Figure 4:
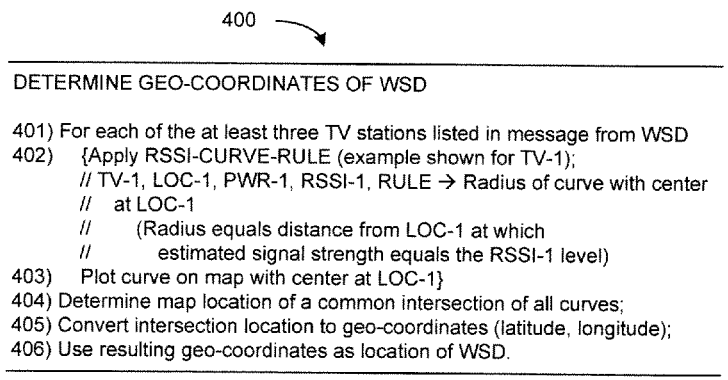
FIG. 4 is an exemplary method, expressed in pseudo-code, for determining WSD geo-coordinates.

FIG. 4 illustrates an exemplary method 400, expressed in pseudo-code, for determining the geo-coordinates of a WSD using the TV data sent in the request from the WSD and the information stored by the EnTVDB. Method 400 uses the TV transmitter designations (e.g. TV channels and/or TV station names) of the TV data to determine the geo-coordinates of the TV transmitter (at least three). Specifically, the EnTVDB includes these TV designations (shown in FIG. 3 as TV-1, TV-2, TV-3) along with their transmit powers (shown in FIG. 3 as PWR-1, PWR-2, and PWR-3).

Method 400 can construct at least three intersecting curves (RSSI-curves) based on RSSIs and the known locations and transmit powers of the TV transmitters, wherein a common intersection of these curves establishes the geo-coordinates of the requesting WSD.

Each curve forms a circle having a center located at one of the TV transmitters (e.g. LOC-1, LOC-2, LOC-3 of FIG. 3). Each circle has a radius equal to a distance, measured from the TV transmitter, at which the estimated strength of the transmitted signal has fallen off to the value of the RSSI corresponding to the particular TV transmitter.

The estimate of transmitted signal strength can be determined by one of several known methods. These methods are referred to generally in FIG. 4 as the RSSI-CURVE-RULE (RULE), i.e., the methods plot a curve corresponding to a given RSSI value. The signal strength of a received signal decreases as the distance from the transmitting antenna increases. In other words, the farther the receiver is from the transmitter antenna, the weaker the resulting received signal strength RSSI. In general, the signal strength decreases according to an inverse fourth-power law, i.e., $RSSI \approx (1/D)^4$, where D is the distance to the antenna. One method, as described above, computes the radius of the circle by solving the above equation for the value of D using an inverse fourth-power law, i.e., $D \approx (1/RSSI)^{1/4}$. An alternative method relies upon FCC F-curves using actual measurement of received field strength at given distances from the transmitting antenna.

With reference to FIG. 4, the pseudo-code of method 400 includes steps numbered 401-406, although other embodiments can include more or fewer steps. In step 401, the pseudo-code ensures that steps 402-403 are repeated for each of the at least three TV transmitters. In step 402 and using the TV transmitter TV-1 as an example, the RSSI-CURVE-RULE can construct a curve for TV transmitter TV-1 using the stored information from the EnTVDB and the RSSI for TV transmitter TV-1 from the WSD. Specifically, the mapping functionality of the EnTVDB applies an RSSI-CURVE-RULE to construct a curve having a center at LOC-1 and a radius equal to a distance from LOC-1 at which received signal strength equals RSSI-1 (based on PWR-1). In step 403, the resulting curve is plotted to a map by a mapping functionality of the EnTVDB. As noted above, steps 402 and 403 are repeated for each of the remaining TV transmitters.

In step 404, the plotted curves are examined by the mapping functionality to find a point of common intersection of the at least three curves. In step 405, this common point is converted by the mapping functionality to the geo-coordinates of longitude and latitude. In step 406, the geo-coordinates are used as the location of the requesting WSD.

Figure 5:
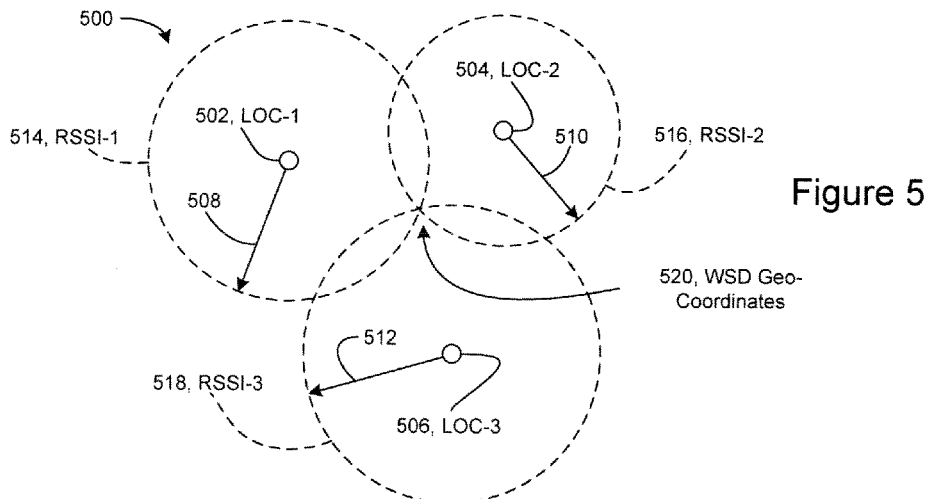
FIG. 5 is a pictorial diagram illustrating an intersection of three RSSI-curves to obtain geo-coordinates of the location of the requesting WSD in the method of FIG. 4.

FIG. 5 is a pictorial diagram 500 illustrating an intersection of three RSSI-curves to obtain the geo-coordinates of a requesting WSD. The three curves shown in FIG. 5 are represented as plots on a map, as though being viewed by humans. In actual practice, the curves are represented in a form suitable for use by the mapping functionality of the EnTVDB. Thus, FIG. 5 is an example only, intended to illustrate the results of applying method 400 to three exemplary TV transmitters.

The centers of the circular curves are shown as LOC-1 502, LOC-2 504, and LOC-3 506, which correspond to the geo-coordinates of the transmitting antennas for the TV transmitters TV-1, TV-2, and TV-3, respectively. The radius of each curve is a line extending outward from the curve's center, e.g. lines 508, 510, and 512 from centers LOC-1 502, LOC-2 504, and LOC-3 506, respectively. The length of each radius corresponds to a distance from the transmitting antenna of the TV transmitter at which the RSSI received from the WSD equals the radiated power from the transmitting antenna, as estimated by the RULE (see, method 400 of FIG. 4). The resulting RSSI-curves 514, 516, and 518 are shown in FIG. 5 using broken lines.

A point of common intersection of curves 514, 516, and 518 identifies a location 520 of the WSD. In one embodiment, location 520 is expressed as geo-coordinates (i.e. latitude and longitude). Once the geo-coordinates have been determined, the EnTVDB can search for available white space using known methods.

Figure 6:
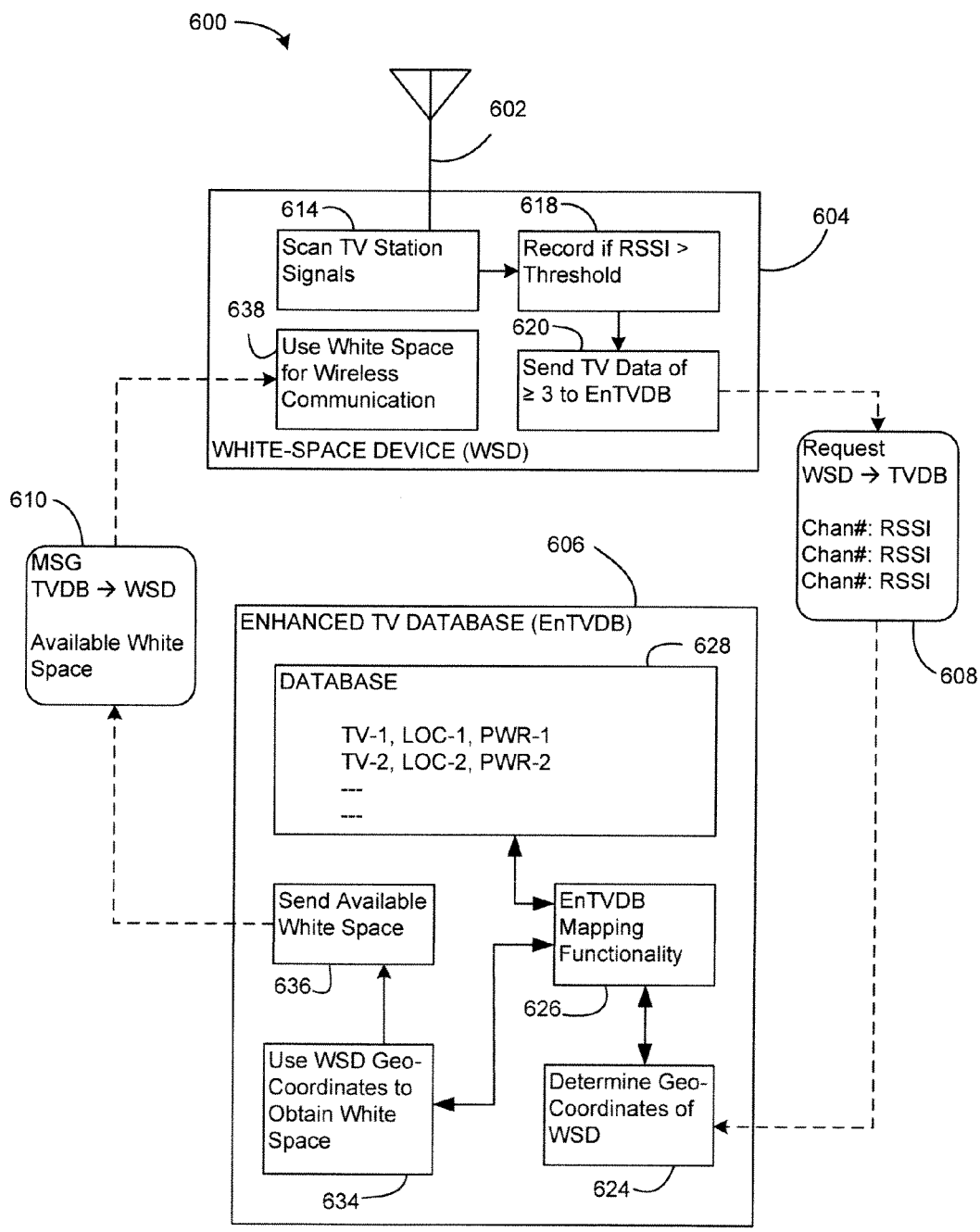
FIG. 6 illustrates further details of a system in which a WSD scans TV signals, measures received signal strengths, sends the TV data to an EnTVDB with a request for white space, and receives the appropriate available white space from the EnTVDB.

FIG. 6 illustrates details of a system 600 including a WSD 604 and an EnTVDB 606. WSD 604 initiates a request for available white space by sending a request 608 to EnTVDB 606. Request 608 includes the above-described TV data, such as the TV transmitter designations and corresponding RSSIs as measured by WSD 604. In response to receipt of request 608, EnTVDB 606 determines the geo-coordinates of WSD 604, uses the geo-coordinates to search for available white space for use at those geo-coordinates, and sends a message 610 to WSD 604 including a list of available white space. WSD 604 can then use available white space for wireless communication.

In one embodiment, WSD 604 can include an antenna 602 and functional blocks 614, 618, 620, and 638. Other embodiments of EnTVDB 606 can include fewer or more blocks, which may have hardware and/or software implementations. Block 614 of WSD 604 can scan for TV signals (using antenna 602) and determine their received signal strengths (e.g. RSSIs). Block 618 can record the TV designation and its associated RSSI as TV data when the scanned signal strength exceeds a predetermined threshold. Block 620 can send the TV data in request 608 to EnTVDB 606 when the TV data includes data from at least three TV transmitters.

In one embodiment, EnTVDB 606 can include a database 628 and functional blocks 626, 624, 634, and 636. Other embodiments of EnTVDB 606 can include fewer or more blocks, which may have hardware and/or software implementations. The FCC requires that the information in database 628 be kept current by timely updating. In one embodiment, an entry of database 628 can include a TV transmitter designation (e.g. TV-1, TV-2, etc.), geo-coordinates of the TV transmitter (e.g. LOC-1, LOC-2, etc.), and a transmit power of the TV transmitter (PWR-1, PWR-2, etc.), as illustrated in FIG. 3. Block 624 can determine the geo-coordinates of WSD 604 using the TV data of request 608 as well as the stored information in database 628, which is accessed by block 626 (performing a mapping functionality). Block 634 can use the geo-coordinates of WSD 604 to obtain the available white space. Block 636 can send the available white space to WSD 604 via message 610.

In some embodiments, the message 610 includes allowable transmitting power levels to be used by a WSD when communicating via the available white space. Under current FCC rules, transmission at one of 40 mW and 100 mW is permitted for mobile operation, based on an analysis of TV station protective contours performed by a TVDB when selecting available white space for use. In General, the farther the WSD is located from a TV station whose channel is designated as available white space, the higher the permissible WSD transmit power level is permitted.

Note that EnTVDB 606 may be implemented upon a programmable hardware/firmware platform, which can then be updated on occasion or periodically. In one embodiment, a standard TVDB can be modified via software to include the functionality described above. As indicated above, an EnTVDB can (1) recognize and properly respond to a request from a WSD that includes TV data (i.e. TV transmitter designations (TV channel numbers or TV station names) and corresponding RSSIs, and (2) use that TV data, the information in its own database, and its mapping functionality to determine the geo-coordinates of the WSD. In other instances, a particular EnTVDB may be implemented using both software and firmware, and in some instances may also have added hardware elements, or some combination of the above.

As indicated above, at least some aspects of the white space device and/or the enhanced TV white space database can be implemented in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Television receivers are becoming more interactive, and higher-end television receivers include features that stream content wirelessly from the Internet and local storage such as personal computers, laptops, and smart phones, to name just a few. TV white space band technology can be used by television for such operation as well. When the WSD is coupled to, or combined with, a television receiver, the receiver circuitry can be used to scan TV transmitters and to measure received signal strength, as illustrated in FIG. 7.

Figure 7:
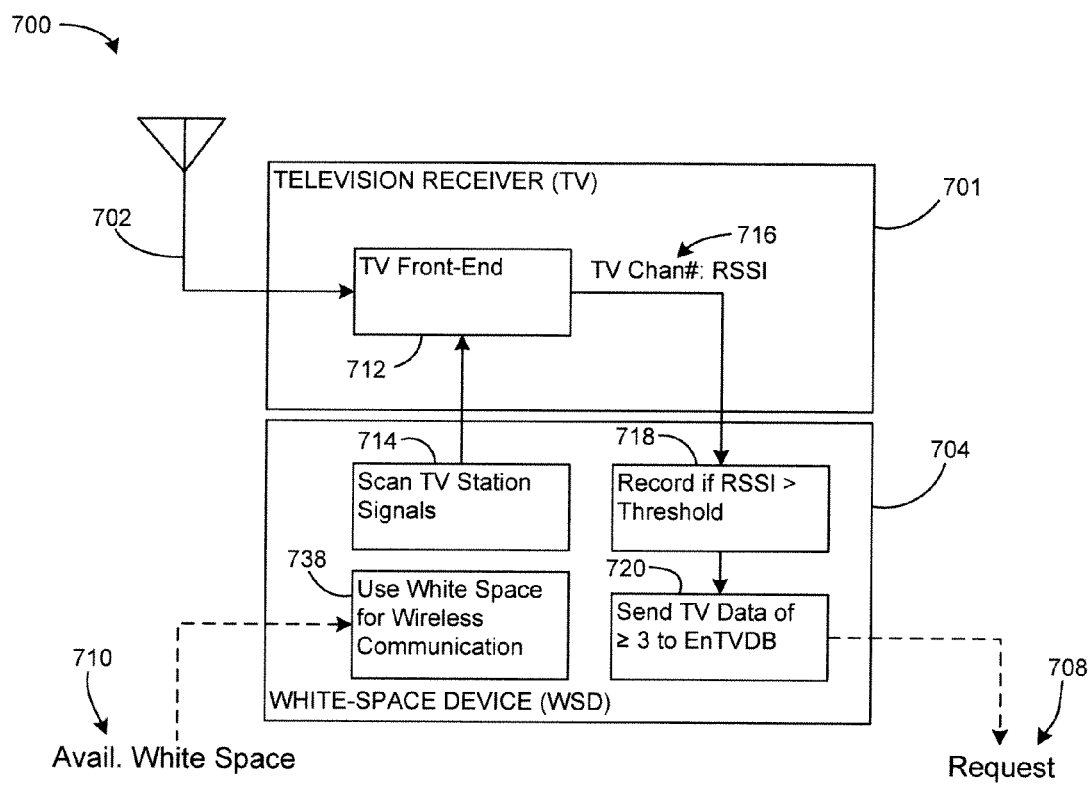
FIG. 7 is a partial system diagram illustrating a white space device coupled with a television receiver for providing the receiver with access to available white space for wireless communication related to its operation.

FIG. 7 is a partial system diagram 700 illustrating a white space device 704 coupled with a television receiver 701 for providing the receiver with access to available white space for wireless communication related to its operation. FIG. 7 can be viewed as though it replaces WSD 604 shown in the upper half of FIG. 6. WSD 704 of FIG. 7 creates and sends request 708, corresponding to request 608 of FIG. 6. WSD 704 receives message 710, corresponding to message 610 of FIG. 6.

In some embodiments, WSD 704 is integrated into television receiver 701, while in other embodiments, WSD 704 is coupled to receiver 701, such as a set top box. Other possible couplings and integrations between WSD 704 and TV 701 are also contemplated (not illustrated). White space device (WSD) 704 includes functional blocks 714, 718, 720, and 738. These blocks correspond, generally, with the functional blocks illustrated in WSD 604 of FIG. 6. FIG. 7 is intended to be exemplary only, and a specific white space device may include more or different functional blocks than those shown here. TV signals are received by antenna 702 and are tuned and amplified by front-end TV circuitry 712. WSD 704 scans TV transmitter signals 714, using a portion of the circuitry of TV 701, e.g., the low-level RF, front-end portion 712, to obtain TV data including TV transmitter designation and received signal strength (RSSI) 716. TV data having RSSI exceeding a predetermined threshold are recorded 718, and a request 708 including TV data from at least three TV transmitters is sent to an enhanced TVDB, such as EnTVDB 606 of FIG. 6.

The enhanced TVDB uses the TV data and information stored within its own database to determine the geo-location of WSD 704, uses the WSD geo-location to obtain available white space, and sends message 710 back to WSD 704 with a description of white space available for use at that location. WSD 704 uses at least one channel of the available white space for wireless communication 738.

While the invention has been described in relation to the embodiments shown in the accompanying drawings, other embodiments, alternatives, and modifications will be apparent to those skilled in the art. It is intended that the Specification be exemplary only, and the scope and spirit of the invention be indicated by the following Claims.

The invention claimed is:

1. A method for obtaining an available white space channel for wireless communication using a white space device, the method comprising:
   scanning for signals of a plurality of TV transmitters;
   recording a TV transmitter designation and a received signal strength of a TV transmitter when the received signal strength is above a predetermined threshold;
   sending TV data of at least three TV transmitters to an enhanced TV white space database, the TV data including recorded TV transmitter designations and received signal strengths for the at least three TV transmitters; and
   receiving at least one available white space channel from the enhanced TV white space database based on geo-coordinates of the white space device, the geo-coordinates of the white space device being determined using the TV data, known geo-coordinates of the at least three TV transmitters, and known field-strength characteristics of the at least three TV transmitters.

2. The method of claim 1, further comprising using an available white space channel for the wireless communication.

3. The method of claim 1, wherein sending the TV data of the at least three TV transmitters comprises sending TV station names of the at least three TV transmitters as the TV transmitter designations.

4. The method of claim 1, wherein sending the TV data of the at least three TV transmitters comprises sending TV channel numbers of the at least three TV transmitters as the TV transmitter designations.

5. The method of claim 1, wherein at least one of the sending the TV data and the receiving the at least one available white space channel is performed via an Internet link.

6. The method of claim 1, further comprising receiving geo-coordinates of the white space device from the enhanced TV white space database.

7. The method of claim 6, further comprising sending the geo-coordinates of the white space device to a standard TV white space database; and
   receiving at least one available white space channel from the standard TV white space database.

8. A method for providing available white space to a white space device, the method comprising:
   using a TV white space database,
   receiving a request for available white space from the white space device, the request including TV data for at least three TV transmitters, the TV data including TV transmitter designations and receive signal strength indicators for the at least three TV transmitters;
   determining geo-coordinates of the white space device using the TV data, known geo-coordinates of the at least three TV transmitters, and known field-strength characteristics of the at least three TV transmitters; and
   identifying at least one available white space channel using the geo-coordinates of the white space device.

9. The method of claim 8, further comprising sending the at least one available white space channel to the white space device.

10. The method of claim 8, wherein the determining geo-coordinates of the white space device comprises:
    using a field strength curve mapping feature to map at least a portion of a curve for each of the at least three TV transmitters, each curve having a center located at a known geo-location of one of the at least three TV transmitters, each curve having a radius equal to a distance from the geo-location at which a transmitted field strength equals a received signal strength indicator (RSSI) corresponding to one of the at least three TV transmitters;
    determining a geo-location corresponding to a mapped common intersection of the at least three curves; and
    using the geo-location corresponding to the mapped common intersection of the at least three curves as the geo-coordinates of the white space device.

11. The method of claim 10, wherein using the field strength curve mapping feature comprises determining a curve radius using an inverse fourth-power law.

12. The method of claim 10, wherein using the field strength curve mapping feature comprises determining a curve radius by reducing transmitted field strength according to FCC F-curves.

13. A non-transitory, computer-readable medium storing computer-executable instructions for obtaining available white space, the instructions when executed by a processor cause the processor to execute a process comprising:
    scanning for signals of a plurality of TV transmitters;
    recording a TV transmitter designation and a received signal strength of a TV transmitter when the received signal strength is above a predetermined threshold;
    sending TV data of at least three TV transmitters to an enhanced TV white space database, the TV data including recorded TV transmitter designations and received signal strengths for the at least three TV transmitters; and
    receiving at least one available white space channel from the enhanced TV white space database based on geo-coordinates of a white space device, the geo-coordinates of the white space device being determined using the TV data, known geo-coordinates of the at least three TV transmitters, and known field-strength characteristics of the at least three TV transmitters.

14. The computer-readable medium of claim 13, further comprising using an available white space for wireless communication.

15. The computer-readable medium of claim 13, wherein sending the TV data of the at least three TV transmitters comprises sending TV station names of the at least three TV transmitters as the TV transmitter designations.

16. The computer-readable medium of claim 13, wherein sending the TV data of the at least three TV transmitters comprises sending TV channel numbers of the at least three TV transmitters as the TV transmitter designations.

17. The computer-readable medium of claim 13, wherein at least one of the sending the TV data and the receiving the at least one available white space channel is performed via an Internet link.

18. A non-transitory, computer-readable medium storing computer-executable instructions for obtaining available white space, the instructions when executed by a processor cause the processor to execute a process comprising:
    using a TV white space database, receiving a request for available white space from a white space device, the request including TV data for at least three TV transmitters, the TV data including TV transmitter designations and receive signal strength indicators for the at least three TV transmitters;

determining geo-coordinates of the white space device using the TV data, known geo-coordinates of the at least three TV transmitters, and known field-strength characteristics of the at least three TV transmitters; and identifying at least one available white space channel using the geo-coordinates of the white space device.

19. The computer-readable medium of claim 18, further comprising sending the at least one available white space channel to the white space device.

20. The computer-readable medium of claim 18, wherein the determining geo-coordinates of the white space device comprises:

using a field strength curve mapping feature to map at least a portion of a curve for each of the at least three TV transmitters, each curve having a center located at a known geo-location of one of the at least three TV transmitters, each curve also having a radius equal to a distance from the geo-location at which a transmitted field strength equals a received signal strength indicator (RSSI) corresponding to one of the at least three TV transmitters;

determining a geo-location corresponding to a mapped common intersection of the at least three curves; and using the geo-location corresponding to the mapped common intersection of the at least three curves as the geo-coordinates of the white space device.

21. A method for determining geo-coordinates of a device, comprising:

scanning for signals of a plurality of TV transmitters;

recording a TV transmitter designation and a received signal strength of a TV transmitter when the received signal strength is above a predetermined threshold;

sending TV data of at least three TV transmitters to an enhanced TV white space database, the TV data including recorded TV transmitter designations and received signal strengths for the at least three TV transmitters; and receiving the geo-coordinates of the device from the enhanced TV white space database, the geo-coordinates of the device being determined using the TV data, known geo-coordinates of the at least three TV transmitters, and known field-strength characteristics of the at least three TV transmitters.

22. A white space device comprising:

means for scanning for signals of a plurality of TV transmitters;

means for recording a TV transmitter designation and a received signal strength of a TV transmitter when the received signal strength is above a predetermined threshold;

means for sending TV data of at least three TV transmitters to an enhanced TV white space database, the TV data including recorded TV transmitter designations and received signal strengths for the at least three TV transmitters; and means for receiving at least one available white space channel from the enhanced TV white space database based on geo-coordinates of the white space device, the geo-coordinates of the white space device being determined using the TV data, known geo-coordinates of the at least three TV transmitters, and known field-strength characteristics of the at least three TV transmitters.

23. The white space device of claim 22, further comprising means for using an available white space channel for wireless communication.

24. The white space device of claim 22, wherein the means for sending the TV data of the at least three TV transmitters comprises means for sending TV station names of the at least three TV transmitters as the TV transmitter designations.

25. The white space device of claim 22, wherein the means for sending the TV data of the at least three TV transmitters comprises means for sending TV channel numbers of the at least three TV transmitters as the TV transmitter designations.

26. The white space device of claim 22, wherein at least one of the means for sending the TV data and the means for receiving the at least one available white space channel is coupled to an Internet link.

27. The white space device of claim 22, further comprising means for receiving geo-coordinates of the white space device from the enhanced TV white space database; and means for saving a copy of the geo-coordinates of the white space device.

28. The white space device of claim 27, further comprising means for sending the geo-coordinates of the white space device to a standard TV white space database; and means for receiving at least one available white space channel from the standard TV white space database.

29. The white space device of claim 22, wherein the white space device is coupled with an electronic device that uses the white space device for wireless communication.

30. The white space device of claim 29, wherein the coupled electronic device is a television receiver, and wherein a first portion of the television receiver is used by the white space device to scan for signals of the plurality of TV transmitters.

31. The white space device of claim 30, wherein a second portion of the television receiver is used by the white space device to determine TV data.

32. An enhanced TV white space database comprising:

means for receiving a request for available white space from a white space device, the request including TV data for at least three TV transmitters, the TV data including TV transmitter designations and receive signal strength indicators for the at least three TV transmitters;

means for determining geo-coordinates of the white space device using the TV data, known geo-coordinates of the at least three TV transmitters, and known field-strength characteristics of the at least three TV transmitters; and means for identifying at least one available white space channel using the geo-coordinates of the white space device.

33. The enhanced TV white space database of claim 32, further comprising means for sending the at least one available white space channel to the white space device.

34. The enhanced TV white space database of claim 32, wherein the means for determining geo-coordinates of the white space device comprises:

means for using a field strength curve mapping feature to map at least a portion of a curve for each of the at least three TV transmitters, each curve having a center located at a known geo-location of one of the at least three TV transmitters, each curve also having a radius equal to a distance from the geo-location at which a transmitted field strength equals a received signal strength indicator (RSSI) corresponding to one of the at least three TV transmitters;

means for determining a geo-location corresponding to a mapped common intersection of the at least three curves; and means for using the geo-location corresponding to the mapped common intersection of the at least three curves as the geo-coordinates of the white space device.

* * * * *